United States Patent
Stöcklin et al.

(10) Patent No.: US 9,538,701 B2
(45) Date of Patent: Jan. 10, 2017

(54) METHOD FOR CONTROLLING A DEVICE FOR CHANGING THE SPREADING RING SECTOR OF A DISC SPREADER AND DISC SPREADER DESIGNED TO CARRY OUT SUCH A METHOD

(71) Applicant: RAUCH Landmaschinenfabrik GmbH, Sinzheim (DE)

(72) Inventors: Volker Stöcklin, Ringsheim (DE); Christian Thullner, Gingen (DE); Martino Minardi, Stuttgart (DE); Norbert Rauch, Sinzheim (DE)

(73) Assignee: RAUCH Landmaschinenfabrik GmbH, Sinzheim (DE)

( * ) Notice: Subject to any disclaimer, the term of this patent is extended or adjusted under 35 U.S.C. 154(b) by 216 days.

(21) Appl. No.: 14/204,560

(22) Filed: Mar. 11, 2014

(65) Prior Publication Data

US 2014/0263713 A1 Sep. 18, 2014

(30) Foreign Application Priority Data

Mar. 12, 2013 (DE) .......................... 10 2013 004 195

(51) Int. Cl.
*A01C 17/00* (2006.01)
*A01C 21/00* (2006.01)
*E01H 10/00* (2006.01)

(52) U.S. Cl.
CPC ........... *A01C 21/002* (2013.01); *A01C 17/008* (2013.01); *A01C 21/00* (2013.01); *E01H 10/007* (2013.01)

(58) Field of Classification Search
CPC ... A01C 21/002; A01C 17/006; A01C 17/008; A01C 17/001; A01C 21/00; E01H 10/007; B65D 83/06; B65D 83/04; E01C 19/20–19/21

(Continued)

(56) References Cited

U.S. PATENT DOCUMENTS

| 6,535,141 | B1* | 3/2003 | Doherty | ................. | A01C 17/00 |
| | | | | | 340/580 |
| 2007/0194155 | A1* | 8/2007 | Kendall | ............... | A01C 17/001 |
| | | | | | 239/650 |

(Continued)

FOREIGN PATENT DOCUMENTS

DE 195 00 824 A1 9/1995
DE 197 23 359 A1 12/1998

(Continued)

OTHER PUBLICATIONS

European Search Report of Apr. 9, 2015.

*Primary Examiner* — Arthur O Hall
*Assistant Examiner* — Juan C Barrera
(74) *Attorney, Agent, or Firm* — McGlew and Tuttle, P.C.

(57) ABSTRACT

Method for controlling a device for changing the spreading ring sector of a disc spreader including a controllable metering device, a distributor disc arranged underneath the metering device and provided with thrower blades, and the device for changing the spreading ring sector of the granular material on the ground. Functional dependencies of a setting parameter of the device for changing the spreading ring sector on a throwing parameter are stored in a database of a control unit assigned to the device for adjusting the spreading ring sector, and a set point value of the throwing parameter or of the setting parameter corresponding thereto is input in the control unit. An actual value of the throwing parameter is determined using a sensor, arranged near to the circumference of the distributor disc, and the actual value of the throwing parameter is compared with the set point value thereof in the control unit.

22 Claims, 4 Drawing Sheets

(58) Field of Classification Search
USPC ............ 239/7, 681–689, 650, 652, 665, 666
See application file for complete search history.

(56) References Cited

U.S. PATENT DOCUMENTS

| | | | |
|---|---|---|---|
| 2010/0072295 A1* | 3/2010 | Usmar ................. | A01C 17/001 239/1 |
| 2011/0127351 A1* | 6/2011 | Lee ......................... | E01C 19/20 239/71 |

FOREIGN PATENT DOCUMENTS

| | | |
|---|---|---|
| DE | 102 37 539 A1 | 2/2004 |
| DE | 10 2005 015 236 A1 | 10/2006 |
| DE | 10 2013 002 751 A1 | 9/2014 |
| EP | 0 287 165 A1 | 10/1988 |
| EP | 0 300 580 A2 | 1/1989 |
| EP | 0 303 325 A2 | 2/1989 |
| EP | 0 682 857 A1 | 11/1995 |
| EP | 0 751 703 B1 | 1/2000 |
| EP | 1 236 388 A1 | 9/2002 |
| EP | 1 275 282 A2 | 1/2003 |
| EP | 2 055 168 A1 | 5/2009 |
| EP | 2 596 694 A1 | 5/2013 |

\* cited by examiner

METHOD FOR CONTROLLING A DEVICE FOR CHANGING THE SPREADING RING SECTOR OF A DISC SPREADER AND DISC SPREADER DESIGNED TO CARRY OUT SUCH A METHOD

CROSS REFERENCE TO RELATED APPLICATIONS

This application claims the benefit of priority under 35 U.S.C. §119 of German patent application DE 10 2013 004 195.3 filed Mar. 12, 2013, the entire contents of which are incorporated herein by reference.

FIELD OF THE INVENTION

The invention relates to a method for controlling at least one device for changing the spreading ring sector of a disc spreader which comprises at least one controllable metering device, at least one distributor disc which is arranged underneath the metering device and is provided with thrower blades, and the at least one device for changing the spreading ring sector of the granular material on the ground, wherein:

(a) functional dependencies of at least one setting parameter of the device for changing the spreading ring sector on at least one throwing parameter are stored in a database of a control unit which is assigned to the device for adjusting the spreading ring sector;

(b) a set point value of the throwing parameter and/or of the setting parameter corresponding thereto are/is input in the control unit;

(c) at least one actual value of the throwing parameter is determined using at least one sensor which is arranged near to the circumference of the distributor disc;

(d) the actual value, which is determined using the sensor, of the throwing parameter is compared with the set point value thereof in the control unit; and (e) in the case of a deviation of the actual value of the throwing parameter from the set point value by more than a predetermined maximum value the setting parameter of the device for changing the spreading ring sector is re-adjusted, with the result that the throwing parameter which corresponds thereto deviates from the set point value thereof by less than the maximum value.

The invention also relates to a disc spreader, which is designed, in particular, for carrying out such a method, having at least one controllable metering device, having at least one distributor disc which is arranged underneath the metering device and is provided with thrower blades, and having at least one device for changing the spreading ring sector of the granular material on the ground, wherein at least the device for changing the spreading ring sector is operatively connected to a control unit in order to control at least one setting parameter of the device for changing the working width as a function of at least one throwing parameter which is determined using at least one sensor, wherein:

(a) functional dependencies of the at least one setting parameter of the device for changing the spreading ring sector on the at least one throwing parameter are stored in a database of the control unit which is assigned to the device for adjusting the spreading ring sector;

(b) the control unit has an input device which permits inputting of a desired set point value of the throwing parameter and/or of the setting parameter corresponding thereto;

(c) the at least one sensor is arranged near to the circumference of the distributor disc and supplies at least one measured value which is representative of the actual value of the throwing parameter;

(d) evaluation electronics, which compare the actual value of the throwing parameter, determined using the sensor, with the set point value thereof, are stored in the control unit, and (e) in the case of a deviation of the actual value of the throwing parameter from the set point value by more than a predetermined maximum value said evaluation electronics re-adjust the setting parameter of the device for changing the spreading ring sector, with the result that the throwing parameter corresponding thereto deviates from the set point value thereof by less than the maximum value.

BACKGROUND OF THE INVENTION

Such disc spreaders are in widespread use, in particular, in agriculture for distributing granular material, such as mineral or organic fertilizer and the like, but also in the form of winter service spreaders for distributing gritting salt and/or grit. Their advantages are predominantly their ease of operation and high level of efficiency alongside comparatively low investment costs. In particular in the case of agricultural disc spreaders, for the most part two-disc fertilizer spreaders have become established, these spreaders being equipped with a pair of distributor discs with metering elements assigned thereto.

In order to ensure the granular material is distributed as desired on the ground, in modern disc spreaders of this type it is possible to perform open-loop or closed-loop control of, on the one hand, the metering of the mass flow of the granular material onto the distributor disc which is assigned to a respective metering device and, on the other hand, the distribution of the granular material by the distributor disc or discs. For the latter it is customary to provide devices for changing the spreading ring sector in order to provide the disc spreader for, for example, different working widths, granular materials and/or types of distribution.

Moreover, however, for the quality of the spreading result in the case of disc spreaders of the generic type which are equipped with rotating distributor discs a determining factor is also to distribute the granular material as uniformly as possible on the ground, such as, for example, the area of a field on which material is to be spread. After the granular material which has been placed on the rotating distributor disc by its metering device has been accelerated by said distributor disc towards its circumference, the granular material is ejected in a fan-like fashion over a specific ejection range, after which the granular material then drops to the ground at a distance from the distributor disc in an essentially annular-segment-shaped range, referred to as the spreading ring sector. In this context, the mass distribution of the granular material is transverse with respect to the direction of travel of the centrifugal spreader, that is to say not uniform over its spreading width but instead the mass distribution generally decreases from a maximum in the central area towards both sides, specifically the essentially radial boundaries with respect to the distributor disc. By arranging one next to the other two distributor discs which are driven in opposite directions, as is customary in the case of two-disc spreaders of the generic type, the transverse distribution of the granular material can be homogenized in the area between the distributor discs and at a short lateral distance from the same, but nevertheless it decreases towards both sides of the entire spreading pattern which is obtained in this way. In the case of fertilizer spreaders this is compensated by what is referred to as the overlap method in which the spreading patterns are overlapped at the edge area. This consequently results in what is referred to as a working width which corresponds to the distance between the lanes used in the overlap method and which is basically smaller than the (total) spreading width which can be, for example, approximately twice as large as the working width. In contrast, in other applications such as, in particular, in the case of winter service spreaders it is attempted to achieve a spreading pattern which has edges which are as steep as possible since an overlap method is not possible here.

In the case of a disc spreader the transverse distribution of the granular material is firstly determined decisively by the spreading ring sector which is generated by its—or by each—distributor disc, specifically by the geometry and spatial position thereof. These are properties which are in turn decisively influenced by the physical of the granular material, specifically on the one hand by the sliding behavior of the particles of the granular material on the disc, on the other hand by the flight behavior thereof after they leave the disc. In this way, particles which slide well, and are therefore relatively smooth and round, leave the disc earlier than relatively rough and sharp-edged particles. In a polar coordinate system with the axis of the distributor disc as a center point, the spreading ring sector therefore migrates in the direction of rotation the rougher and more sharp-edged the particles. On the other hand, the average flight distance of small, lightweight, sharp-edged or rough particles is shorter than that of large, smooth or heavy particles, with the result that in the first case the spreading ring sector is closer to the distributor disc and also has a shorter radial extent than in the second case.

Apart from the granular-material-specific influencing factors, structural parameters also play a role. For example, the centering angle of the spreading ring sector is influenced by the mass flow of granular material which impacts on the distributor disc, i.e. by the respective setting of the associated metering device, in the sense that it becomes larger the larger the mass flow of granular material or the greater the extent to which the metering device is opened. Furthermore, the point at which the granular material is placed on the distributor disc influences the position of the spreading ring sector to the extent that it migrates further counter to the direction of rotation the further the placing point is away from the axis. Furthermore, the spreading ring sector can be "rotated" about the rotational axis of the distributor disc if the placing point of the granular material is moved in the circumferential direction of the distributor disc. Finally, the rotational speed of the distributor disc or discs also determines the extent and position of the spreading ring sector, wherein the faster the distributor disc rotates, the larger the spreading ring sector and the further away it is from the distributor disc.

Since the granular-material-specific properties, that is to say, in particular, the sliding properties and flight properties of the particles of granular material (fraction) which are used, can be controlled the least and are most likely to be subject to fluctuations, in the fertilizing technology use is made of what are referred to as spreading tables, in which, for a specific granular material, corresponding settings for achieving specific working widths and spreading quantities at the disc spreader, that is to say for example the rotational speed of the distributor discs, the position of the point at which the granular material is placed on the distributor discs, the size of the metering opening of the metering device etc. can be read off in order to distribute a specific quantity of the granular material over a specific working width. These spreading tables are recorded in spreading trials and always apply only to the specifically investigated granular material and the spreader used in the context. Since, on the one hand, the granular materials are not standardized and consequently have changing properties (for example the physical properties of usually hygroscopic mineral fertilizer particles are therefore capable of changing hugely in the presence of moisture), and on the other hand the disc spreaders also differ from one another in structural terms it is frequently necessary, in certain circumstances before the spreading work, firstly to perform what is referred to as a turning off test in order to correct the setting of the metering opening of the metering device in accordance with the result of the turning off test and subsequently carry out a spreading test under operating conditions in order to optimize the spreading pattern or the actual distribution of the granular material on the ground in approximately annular-segment-shaped boundaries by means of setting measures at the disc spreader. However, even this often does not bring about a uniform transverse distribution of the granular material because the distribution is influenced by further factors during the spreading operation (subsequently), for example the inclination situation of the spreader on uneven ground, by influences of the wind, the exposure of the granular material to air humidity or even rain, by possible changes, mentioned above, in the physical properties of the granular material etc.

In the prior art it has already been recognized that eliminating these deficiencies is only possible by recording current spreading states during the spreading work in order to be able to intervene in a corrective fashion in the setting or control of the disc spreader when deviations are detected. It is therefore known, for example, to arrange two or more impact sensors on the circumference of the distributor disc in order to detect the general position of the ejection range, and to record a measurement variable which is representative of the number of particles per time unit (EP 0 682 857 A1). In a specific case, the impact sensors are embodied in a tubular shape and arranged on a carrier which can be adjusted manually in a transverse direction, wherein the sound emitted by the tube is measured with a sonotrode. In this context, it is assumed that a type of Gaussian normal distribution with a maximum quantity in the center is present within the spreading ring sector with the result that if the sensor is located in the region of the greatest particle density, which corresponds to the greatest number of impacts, the center of the spreading ring sector has been detected. By changing the setting of the spreader (moving the placing point, changing the rotational speed etc.), the maximum is moved into the desired position and it is then assumed that the spreading ring sector is also located in the desired position. However, in this way it is not possible to detect the transverse distribution of the granular material over the entire ejection range and this method ignores, in particular, the fact that the maximum quantity does not necessarily have to be located in the centre of the spreading sector. No conclusions whatsoever about the radial extent of the spreading ring sector, that is to say in the ejection direction, can be drawn from the number of impacts either. The centering angle of the spreading ring sector cannot be detected with only two positionally fixed sonotrodes either. Consequently, overall considerable inaccuracies occur when detecting the actual state by sensor.

In a similar but purely visually operating method (DE 14 57 863 A1), the sensors are embodied as pivotably suspended impact plates which are deflected when the particles of granular material impact, with the result that the user can determine visually whether the plate has been impacted by particles. In this way, the user can approximately gauge the radial boundary of the spreading ring sector and appropriately set the disc spreader when undesired deviations occur. Otherwise, what has been stated above with respect to EP 0 682 857 A1 very largely applies.

Furthermore, it is known (EP 0 303 325 A1) to distribute a plurality of sensors on the circumference of the distributor disc in order to display to the driver the position of the ejection range on the distributor disc and subsequently correspondingly intervene in the control in a manual or automatic fashion. The document leaves open how these sensors operate and which measurement variables are recorded in the process. In all the abovementioned cases, only the position of the ejection range, and in the case mentioned first the position of the maximum quantity, is determined and corrective intervention is carried out in the case of deviations. On the other hand, neither the actual position and extent of the spreading ring sector, i.e. that range in which the particles are actually deposited on the ground, nor the mass distribution which is present there is detected. Instead, it is assumed that the ratios which are present or detected directly at the circumference of the disc are equally present on the ground, which does not correspond to the facts.

In a two-disc spreader of the design mentioned last, which is also known, not only the ejection range is detected by means of sensors, but also the quantities of granular material which is actually spread are detected (EP 0 287 165 A1) in that the container with the granular material is weighed using a subtraction method, that is to say the granular material which is discharged per time unit is detected. As a result, although definitive information is obtained about the quantity of granular material discharged, such definitive information is not obtained about the quantity distribution in the spreading ring sector. Moreover, the detection of the weight is structurally very complex and also inaccurate on uneven ground because of the dynamic operation of the disc spreader.

In addition, in the case of a single-disc spreader it is known (EP 0 300 580 A1) to make the spreading ring sector wider or narrower by moving the point at which the granular material is placed on the distributor disc. In order to detect the current extent of the ejection range, optical light sensors or acoustic sensors, which operate according to the reflection principle, are arranged on the disc circumference. These sensors detect not only whether particles are actually located in the beam path, but also the density thereof. In the case of deviations of input set point values, the ejection range is correspondingly changed by moving the placing point and/or the quantity of granular material by controlling the metering opening. However, in fact only the ejection range at the disc and not the spreading ring sector is also determined here and the sensory detection of the granular material is subject to considerable inaccuracies.

DE 195 00 824 A1 discloses a further method in which the stream of fertilizer is recorded photooptically in terms of its direction and speed and the quantity of fertilizer is detected and the data which is determined is input into a computer for determining the transverse distribution and distribution accuracy. The fertilizer spreader is to be set according to predefined boundary limits on the basis of the calculated data. In this method, on the one hand measurement is carried out at a location in the ejection range which is not detected, on the other hand, the relationships between the measured values and the settings which are performed subsequently cannot be understood on the basis of the document.

DE 197 23 359 A1 describes a disc spreader of the generic type in the form of a two-disc spreader with a granular material container with metering openings which can be adjusted by means of metering devices, distributor discs which are arranged underneath the metering openings, run around an essentially vertical axis and have thrower blades which distribute the granular material in a spreading ring sector on the ground, as well as having devices for changing the spreading ring sector which are capable of adjusting the point at which the granular material is placed on the distributor discs and/or the thrower wings of the distributor discs or else of changing the inclination of the distributor discs with respect to the normal plane. A method for setting such a two-disc spreader for distributing the granular material in an adjustable quantity over an adjustable working width is described, according to which quantity of granular material (setting of the metering device) and at least one throwing parameter which characterizes the flight behavior of a specific granular material, such as the ejection range, the mass distribution in the ejection range and the average flight distance are stored as set point values in a computer for each working width. By means of a sensor which is arranged near to the circumference of the distributor disc and which is capable of detecting the ejection range in which the particles of granular material leave the distributor disc, the mass distribution of the granular material within the ejection range and the absolute mass of the granular material per time unit are detected as actual values in addition to the ejection range. The current value which characterizes the flight behavior can be determined on the basis of the actual value of the mass per time unit and the setting of the metering device or the size of the metering opening thereof and/or on the basis of the actual value of the ejection range and the mass distribution as well as the position of the device for changing the spreading ring sector. In evaluation electronics, the actual values are compared with the set point values and the metering opening of the metering device is set to the predefined quantity of granular material on the basis of the detected deviations, and the ejection range, the mass distribution within said range and the average flight distance are set to the set point values by means of the device for changing the spreading ring sector.

However, with such a disc spreader which is embodied in such a way it has also been found that the setting parameters of the device for changing the spreading ring sector, generated on the basis of the actual values, detected by sensor, for the respective throwing parameters are subject to considerable inaccuracies which result in correspondingly inaccurate setting of the device for changing the spreading ring sector of the disc spreader, which results in a transverse distribution of the granular material (over the working width) which is not optimum.

SUMMARY OF THE INVENTION

The invention is therefore based on the object of developing a method for controlling at least one device for changing the spreading ring sector of a disc spreader of the type mentioned at the beginning to the effect that on the basis of the actual values, detected by sensor, of practically any throwing parameters it is possible to set or re-adjust the device for changing the spreading ring sector to a setting parameter which is as accurate as possible, is representative of reality and ensures the desired transverse distribution of the granular material on the ground.

From a process technology point of view this object is achieved with a method of the type mentioned at the beginning in that the functional dependencies, stored in the database, of the at least one setting parameter on the at least one throwing parameter take into account the type of the respective distributor disc and/or the thrower blades thereof.

In terms of apparatus technology, the invention correspondingly provides, for the purpose of solving this problem in a disc spreader of the type mentioned at the beginning, that the functional dependencies, stored in the database, of the at least one setting parameter on the at least one throwing parameter take into account the type of the respective distributor disc and/or the thrower blades thereof.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

The invention is based on the realization that the sensors which are respectively used for detecting one or more throwing parameters are always capable of detecting only a number of values which are representative of the throwing parameters, whereas the type of the respectively used distributor disc or the combination of distributor disc/thrower blades brings about a change in virtually all the throwing parameters. Consequently, the use of another distributor disc and/or of other thrower blades inevitably leads to faulty setting parameters if only a number of throwing parameters are detected by sensor and a setting parameter is derived therefrom, without taking into account the fact that other throwing parameters, not detected by sensor and which basically required a setting parameter which was different from the latter, have also changed as a result.

In this context, the replacement of one distributor disc with another with a larger circumference in comparison is mentioned merely by way of example. The latter distributor disc is known to bring about a higher ejection speed, which can be detected, for example, by means of a pulse sensor such as is proposed in DE 197 23 359 A1 cited above. Meanwhile, the relatively large distributor disc also acts on the granular material, for example on the one hand with a different ejection angle (with respect to the radial direction), since as it slides along the (relatively long) thrower blades, it experiences a higher acceleration, which cannot be detected with such a pulse sensor. On the other hand, the larger distributor disc also acts on the granular material with, for example, a greater twist (inherent rotation of the granular material) which in principle cannot be detected at all by sensor. Both of these things result in a change in the spreading ring sector (in addition to the change thereof owing to the speed detected by sensor), which change is not taken into account in the subsequent re-adjustment or setting of the setting parameter of the device for changing the spreading ring sector, which gives rise to faulty setting of the device for changing the spreading ring sector and consequently to a transverse distribution of the granular material in the respective spreading ring sector which is not optimum.

The invention counters this problem in that the functional dependencies, stored in the database, of the at least one setting parameter on the at least one throwing parameter already take into account the type of the respective distributor disc and/or the thrower blades thereof, i.e. the control unit now "knows" the type of the current distributor disc and/or thrower blades and is capable of determining on the basis thereof and using the throwing parameter or parameters detected by sensor the correct setting parameters of the device for changing the spreading ring sector which are consequently the correct ones for the respective distributor disc or thrower blades, with the result that the desired transverse distribution of granular material is produced on the ground. The control of the throwing parameter of the device for changing the spreading ring sector can then be carried out in basically any desired way by, for example, forming the difference between the actual value of the setting parameter determined by sensor and the previously input set point value and determining on the basis thereof, using the functional dependence of the throwing parameter stored in the database on the throwing parameter, the necessary change in the setting parameter, or the setting parameter of the device for changing the spreading ring sector is re-adjusted, for example, until the throwing parameter which corresponds thereto deviates from the set point value by less than the predetermined maximum value, which can, moreover, be approximately 0 or can certainly also have a certain tolerance.

Furthermore, the invention makes it possible to eliminate what is referred to as the "quantity effect" according to which the spreading pattern (the distribution of the granular material on the ground) is changed if the metered quantity is changed (whether owing to a changed velocity, a locally larger or smaller discharge quantity or for other reasons). Owing to the spreader-disc-specific and/or thrower-wing-specific control of the setting parameter of the device for changing the spreading ring sector it is also possible to this extent to perform fully automatic precise correction of the spreading pattern as soon as an undesired change in the spreading pattern has been detected by sensor.

As already indicated, the functional dependencies, stored in the database, of the at least one setting parameter of the device for changing the spreading ring sector on the at least one throwing parameter should also preferably take into account
  the physical properties of the respective granular material, in particular the flight properties thereof; and/or
  the respective mass flow of granular material which is placed on the distributor disc by means of the metering device; and/or
  the respective working width,
such as is known as such from the abovementioned prior art according to DE 197 23 359 A1.

The set point values of the throwing parameter or of the setting parameter corresponding thereto for various types of distributor discs and/or the thrower blades thereof and, in particular, also for
  the physical properties of various granular materials; and/or
  various mass flows of granular material which is placed on the distributor disc by means of the metering device; and/or various working widths can be determined, in particular, experimentally and input in the control unit. In this way, set point values of the throwing parameter or of the setting parameter corresponding thereto can be determined experimentally for, for example, any type of distributor disc or for any combination of distributor disc with a respective type of thrower blades for various granular materials, mass flows and working width, and can be made available to the user, such as for example by means of distributor-disc-specific or thrower-blade-specific spreading tables which are provided in printed form with the distributor discs or can be called on the Internet. In particular, such set point values can be stored in the database assigned to the control unit and called and selected by the user as required.

As already indicated, the device for changing the spreading ring sector can be at least one device from the group comprising:

- a device for adjusting the point at which the granular material is placed on the distributor disc, the setting parameter of which is the point at which the granular material is placed on the distributor disc (which can be adjusted, for example, by actuator);
- a device for changing the rotational speed of the distributor disc, the setting parameter of which is the rotational speed of the distributor disc (the drive element of which can, for example, be accelerated or slowed down);
- a device for adjusting the inclination of the distributor disc, the setting parameter of which is the angle of inclination of the distributor disc (which can be adjusted, for example, by actuator); and
- a device for adjusting the thrower blades of the distributor disc, the setting parameter of which is the relative position of the thrower blades with respect to the distributor disc (which can be adjusted, for example, by actuator), which are known as such from the prior art and serve to change the spreading ring sector within which the granular material ejected by the distributor disc falls on the ground. If, for example, the point at which the granular material is placed on the distributor disc is changed in/counter to the direction of rotation of the distributor disc, the geometric shape of the spreading ring sector remains essentially unchanged, but is moved in/counter to the direction of rotation of the distributor disc in that it is rotated about the rotational axis of the distributor disc. Moreover the point at which the granular material is placed on the distributor disc influences the position of the spreading ring sector to the effect that it migrates to a greater extent counter to the direction of rotation of the distributor disc the greater the distance between the placing point and the rotational axis, and the further out the placing point is located in the radial direction. If, for example, the inclination of the distributor disc or else of the entire disc spreader is changed, the spreading ring sector migrates closer to the rotational axis of the distributor disc in the lowered radial section thereof, while in the radial section of the distributor disc which is raised in comparison with the latter said spreading ring sector migrates further away from the rotational axis thereof; the spreading ring sector is consequently "distorted". If, for example, the rotational speed of the distributor disc is increased/decreased, the spreading ring sector is increased/decreased in size overall. In any case, the spreading ring sector can be adapted to the desired transverse distribution of the granular material, wherein, of course, a plurality of such devices for changing the spreading ring sector can also be provided, such as, for example, both a device for changing the placing point and a device for changing the rotational speed of the distributor disc, as is in any case generally also present, in particular, in the case of hydraulically or electrically driven disc spreaders, which devices can be controlled synchronously by the control unit as a function of the throwing parameters which are detected by sensor.

The throwing parameter or parameters can preferably be a parameter/parameters which is/are representative of the circumferential distribution of the granular material, wherein this parameter comprises, in particular, at least one angle value in a polar coordinate system with a center which is arranged on the rotational axis of the distributor disc and which is capable of representing the circumferential distribution of the granular material. Such an angle value may designate, for example, that angle in the polar coordinate system at which the maximum mass of granular material is ejected by the distributor disc. Alternatively or additionally, the angle value can, for example, also designate an angle which describes the distribution curve of the mass of discharged granular material over the circumference of the distributor disc, such as a specific quantile, for example a 50% quantile, in which in each case 50 mass % of granular material ("$\Phi_{50}$") is distributed to the right and left (or in and counter to the clockwise direction) of this angle, a 10% or 90% quantile in which 10 mass % and 90 mass % or 90 mass % and 10 mass % of granular material ("$\Phi_{10}$" or "$\Phi_{90}$") etc. is distributed to the right and left or to the left and right (i.e. in and counter to the clockwise direction or counter to and in the clockwise direction) of this angle. One or more such angles which are representative of the circumferential distribution of the granular material can then be input, for example, as a set point value/set point values, or, in particular, as mentioned above can be called or selected as set point values which have already been previously input into the database, and the actual values, determined by sensor, of this angle/these angles can then be re-adjusted to the set point value or values which has/have been input or selected.

The throwing parameter or parameters can be determined, for example, from one or more measured values detected by sensor from the group:

- the mass flow of the granular material which is thrown by the distributor disc in a respective circumferential area;
- the speed of the granular material which is thrown by the distributor disc in a respective circumferential area; and
- the direction of the granular material which is thrown by the distributor disc in a respective circumferential area.

As far as the functional dependencies, stored in the database of the control unit, of the setting parameter or parameters on the throwing parameter or parameters are concerned it can expediently be provided that the following are stored in the database of the control unit for each type of a respective distributor disc and/or the thrower blades thereof:

- separate functional dependencies of the at least one setting parameter on the at least one throwing parameter, or
- separate factors for adapting the functional dependencies of the at least one spreading parameter on the at least one throwing parameter to the respective distributor disc and/or the thrower blades thereof.

In the first-mentioned case, accordingly separate functional dependencies can be assigned to a respective type of distributor disc or a respective combination of distributor disc and thrower blades, which dependencies are called, depending on the distributor disc or thrower blades in operation, while in the last-mentioned case only one or more functional dependencies which are valid for a group of distributor discs or combinations of distributor discs and thrower blades are stored, to which dependencies the associated factor or factors is/are applied depending on the distributor disc or thrower blades in operation. The same applies to the functional dependencies of the setting parameter or parameters on further parameters such as, in particular, the abovementioned physical (flight) properties of the respectively set granular material, of the respectively desired mass flow of granular material and/or the respectively desired working width. The functional dependencies of the at least one setting parameter on the at least one throwing parameter may also be, for example, characteristic lines, characteristic curves or characteristic diagrams.

In order to "inform" the control unit what type of distributor disc or what combination of distributor disc and thrower blades is currently being used, it is conceivable, on the one hand, that the type of the respective distributor disc and/or the thrower blades thereof is input in an input device of the control unit, wherein, in particular, a selection of distributor discs/thrower blades can be stored in the database and displayed on a display device connected to the database, from which distributor discs/thrower blades the user can select the respective combination by selecting, for example, the respective combination displayed on the display device. On the other hand, it is, in particular, conceivable that the type of the respective distributor disc and/or the thrower blades thereof is detected by sensor, in particular in a contact-free fashion such as, for example, optically, by means of ultrasound or electromagnetically, for example by means of a radar sensor, wherein a separate sensor can be provided for this or else the sensor which serves for determining the throwing parameter by sensor can be used. Alternatively, the disc/thrower blade type can be detected, for example, by means of an RFID transponder of the respective distributor disc and/or the thrower blades thereof. In both cases, manual input of the distributor disc type or thrower blade type by the user can be dispensed with and the control unit can detect automatically the particular type of distributor disc/thrower blade, in order to activate the corresponding functional dependencies of the setting parameter on the throwing parameter.

With respect to the sensor, according to one advantageous refinement it is possible to provide that the actual value of the at least one throwing parameter is determined using at least one contact-free sensor, wherein the contact-free sensor emits, in particular, a measuring signal with a directional component which is directed vertically upwards. The, for example at a similar height level to the distributor disc itself or at a height level which is lower with respect to it, consequently emits its measuring signals preferably approximately vertically or obliquely upwards, that is to say at an angle greater than 0° and less than or equal to 90° with respect to the horizontal level, as a result of which interference signals owing to moving parts of plants or soil particles are reliably avoided. The contactless sensor can be, in particular, a radar sensor or ultrasonic sensor, wherein the first-mentioned sensors have proven particularly advantageous. It is therefore possible, by means of radar sensors such as, for example, Doppler radar sensors, on the one hand to detect by sensor the mass distribution of the granular material which is thrown by the distributor disc on the basis of the energy density (signal amplitude), and on the other hand to detect the speed of the granular material on the basis of the speed-proportional frequency shift of the signal reflected at the particles of granular material owing to the Doppler effect. If such a sensor accordingly moves over the ejection range of the particles of granular material away from the distributor disc, it is possible to determine on this basis, for example, on the one hand the abovementioned angles which are representative of the mass distribution of the granular material around the circumference of the distributor disc and, on the other hand, the speeds there, which are representative of the lateral extent of the spreading ring sector. It is therefore possible, in particular, for a Doppler radar sensor, if its radar waves are reflected diffusely by the particles of granular material thrown by a distributor disc, and received, to provide, owing to the Doppler effect, a radar signal which is frequency-shifted proportionally to the speed of the particles of granular material:

$$f_D = 2 \cdot f_0 \cdot v/c_0 \cdot \cos(\alpha)$$

where
$f_D$=Doppler frequency;
$f_0$=transmission frequency of the radar sensor;
v=speed value of the particles of granular material;
$c_0$=speed of light; and
α=angle between the direction of movement of the particles of granular material and the straight connecting line between the radar sensor and the detected particle.

Furthermore, the received radar signal amplitude is proportional to the mass of the particles of granular material:

$$\frac{P_e}{P_s} = \frac{g^2 \cdot \lambda^2 \cdot \delta}{(4\pi) \cdot D^4}$$

where
$P_e$=power of the received signal;
$P_s$=transmission power;
λ=wavelength of the transmission signal (for example 12 mm at 24 GHz);
δ=radar cross section (RCS) of a particle of granular material which is proportional to the size of the particles of granular material;
D=distance of the radar sensor from the particles; and
g=antenna gain given the same transmission/reception antenna.

In one advantageous refinement of the invention it is possible to provide, on the one hand, that at least one sensor is pivoted concentrically with respect to the rotational axis of the distributor disc, in particular by an angle of at least 100°, preferably by an angle of at least 120°, most preferably by an angle of at least 140°, for example by an angle in the range from approximately 150° to approximately 180°, in order as far as possible to detect the entire ejection range of the particles of granular material from the distributor disc, wherein the sensor supplies, in particular both in the one pivoting direction and in the other pivoting direction, the throwing parameter or measured values which are representative thereof at different angular positions. The sensor is consequently preferably more or less moved continuously to and fro through the entire ejection range of the particles of granular material with a constant or else variable speed, wherein said sensor can supply successive measured values for the respective angular position in which it is currently located. The rotational drive of such a sensor and the transmission of movement thereof to a carrier of the sensor should be robust with regard to tremors and vibrations which usually occur during operation and to the acting impurities of solid (fine) particles of granular material as well as thrown-up dust, and therefore be protected as far as possible against external effects. A drive arrangement, advantageous in this respect, of one or more sensors which are pivotable coaxially with respect to the rotational axis of the distributor disc can be found in DE 10 2013 002 751.9, which was not yet published on the priority date of the present application.

On the other hand, in one advantageous refinement of the invention it is possible to provide instead that a multiplicity of sensors is arranged concentrically around the circumference of the rotational axis of the distributor disc, in particular by an angle of at least 100°, preferably by an angle of at least 120° C., most preferably by an angle of at least 140°, for example by an angle in the range from approximately 150° to approximately 180°, in order to detect if possible the entire ejection range of the particles of granular material from the distributor disc, wherein each sensor supplies the throwing parameter or measured values representative thereof for its respective circumferential position. In such a sensor array whose sensors are preferably arranged at equidistant intervals on a circular path whose centre point is intersected by the rotational axis of the distributor disc, each sensor can continuously supply measured values for its respective angular position. In this context, for example at least approximately 15 sensors, preferably at least approximately 20 sensors, and most preferably at least approximately 28 sensors can be provided.

In order to be able to adapt the relative arrangement of the sensor or sensors in an optimum way to the geometry of the type of distributor disc and/or thrower blades respectively used, it may also be expedient if the (respective) sensor is adjusted as a function of the respective distributor disc and/or the thrower blades thereof in a predefined position for the respective distributor disc and/or the thrower blades thereof essentially radially with respect to the rotational axis of the distributor disc, which can be done, for example, in that the sensor can be secured to a carrier, rotationally driven or stationary, with a component of direction of its extent which is radial with respect to the distributor disc, at various radial positions. Alternatively or additionally, in this context it is conceivable that a multiplicity of sensors which are arranged in different, in particular positionally fixed, radial positions with respect to the distributor disc is provided, which sensors are activated or deactivated as a function of the respective distributor disc and/or the thrower blades thereof. This can in turn be done manually such as, for example, by correspondingly making the selection on a display device, or automatically if a specific type of distributor disc/thrower blades has been detected by sensor, in particular by means of an RFID transponder which is integrated in the distributor disc/thrower blades.

Moreover, it is, of course, expedient if the above method steps (c) to (e) are carried out essentially continuously or at periodic time intervals during the spreading work, wherein said method steps can be carried out, in particular, more or less in real time.

As mentioned at the beginning, in particular in agriculture generally two-disc spreaders are used at present, which two-disc spreaders have two distributor discs which are arranged at a lateral distance from one another and which usually, but not necessarily, rotate in opposite directions, wherein the distributor disc which is on the left in the direction of travel (viewed from above) rotates in an anticlockwise direction, while the distributor disc which is on the right in the direction of travel (viewed from above) rotates in the clockwise direction (consequently, both distributor discs rotate counter to the direction of travel when viewed from the inside to the outside). With respect to such a two-disc spreader, reference is made, purely by way of example, to DE 10 2005 015 236 A1.

The invention is appropriate, on the one hand, for single-disc spreaders as well as, on the other hand, in particular for two-disc spreaders such as those of the abovementioned type, wherein it is consequently possible to provide in one advantageous refinement that the disc spreader comprises at least (or precisely) two controllable metering devices, in each case a distributor disc which is arranged underneath a respective metering device and is provided with thrower blades, and in each case a device, assigned to a respective distributor disc for changing the spreading ring sector of the granular material on the ground.

With a two-disc spreader of this type it is possible, according to one embodiment variant, to provide that (c) the at least one actual value of the throwing parameter is determined using in each case at least one sensor, arranged near to the circumference of each distributor disc, for each distributor disc independently of one another;

(d) the actual value of the throwing parameter which is determined using the respective sensor is compared with the set point value thereof in the control unit; and (e) in the case of a deviation of the actual value of the throwing parameter from the set point value by more than a predetermined maximum value the setting parameter of a respective device for changing the spreading ring sector is re-adjusted independently of one another, with the result that the respective throwing parameter which corresponds thereto for each distributor disc deviates from the set point value thereof by less than the maximum value.

Consequently, each device for changing the spreading ring sector, assigned to a respective distributor disc, can be controlled independently of one another as a function of the actual values of the throwing parameter which are respectively detected by sensor, which has the advantage, in particular, that, for example even for each device for changing the spreading ring sector, different set point values for the throwing parameter which is representative of different working widths, mass flows of granular material etc. can be input in the control unit, as is necessary in various spreading situations such as, for example, when spreading on boundaries or at edges, when spreading on a slope, when spreading in a wedge and the like.

Whereas in the case of "normal" overlap travel along the lanes in the interior of a field set point values, which correspond to one another or are the same, of the throwing parameter or of the setting parameter corresponding thereto are consequently input in the control unit expediently for each device for changing the spreading ring sector, in the case of a two-disc or multi-disc spreader which is configured in such a way it is preferably possible to provide that in the event of the spreading ring sectors which are positioned on the ground being intended to be different (such as, for example, owing to one of the abovementioned spreading situations), a plurality of set point values, which are different for the respective devices for changing the spreading ring sector, of the throwing parameter and/or of the setting parameter corresponding thereto are input.

However, according to one alternative embodiment variant in the case of a two-disc spreader of this type it is also possible to provide that (c) the at least one actual value of the throwing parameter is determined using at least one sensor, arranged near to the circumference of only one distributor disc, for this distributor disc;

(d) the actual value of the throwing parameter which is determined using the sensor which is assigned to this distributor disc is compared with the set point value thereof in the control unit; and (e) in the case of a deviation of the actual value of the throwing parameter from the set point value by more than a predetermined maximum value the setting parameter of all the devices for changing the spreading ring sector is re-adjusted in a way which corresponds to one another, with the result that the throwing parameter, corresponding thereto, of the distributor disc provided with the sensor deviates from the set point value thereof by less than the maximum value.

Consequently, each device for changing the spreading ring sector, assigned to a respective distributor disc, can be controlled as a function of the actual values of the throwing parameter which are detected by sensor on only one distributor disc in that the device for changing the spreading ring sector which is assigned to that distributor disc and which is not provided with sensors is controlled synchronously or in a "mirrored fashion" in the case of distributor discs which are driven in opposite directions, in accordance with the device for changing the spreading ring sector which is assigned to that distributor disc and whose sensor can supply actual values which are representative of the setting parameters. In the case of "normal" overlap travel along the lanes in the interior of a field, consequently a set point value of the throwing parameter or of the setting parameter corresponding thereto which is the same for both devices for changing the spreading ring sector can be input in the control unit, whereupon in the case of excessive deviation of the actual value detected by sensor from the set point value on one side of the setting parameters of the devices for changing the spreading ring sector of both sides re-adjustment is performed for a correspondingly long time until the throwing parameter, corresponding thereto, of the distributor disc which is provided with the sensor corresponds again largely to the set point value. If, for example, owing to desired different working widths, mass flows of granular material etc. different spreading ring sectors are desired as is the case, for example, in the case of boundary spreading or edge spreading, when spreading on a slope, when spreading in a wedge and the like, this can also be achieved even when there is only one distributor disc provided with a sensor in that the control, for example, on the distributor disc which is not provided with a sensor is deactivated for such a spreading process. Alternatively, for example when in the case of edge spreading the distributor disc which is provided with a sensor is located on the side facing the edge of the field, the control of the device for changing the spreading ring sector which is assigned to this distributor disc can be set to the new set point value while the device for changing the spreading ring sector of the distributor disc which faces the interior of the field and is not equipped with a sensor is interrupted and the device for changing the spreading ring sector according to the parameter or the last parameters is kept constant. Conversely, for example when in the case of edge spreading the distributor disc which is provided with a sensor is located on the side facing the interior of the field, the adjustment of the device for changing the spreading ring sector which is assigned to this distributor disc can be continued in accordance with the previous set point value while the device for changing the spreading ring sector of the distributor disc which faces the edge of the field and is not equipped with a sensor is deactivated and the device for changing the spreading ring sector of this distributor disc is controlled in accordance with previously input setting parameters. In the last-mentioned case it is also conceivable that setting parameters which are suitable for the respective spreading situation from previous control processes are stored and are applied for that device for changing the spreading ring sector which is assigned to the distributor disc which is not provided with a sensor, in accordance with the respective type of spreading disc or thrower blade, the working width, the type of granular material etc.

Figure 1:
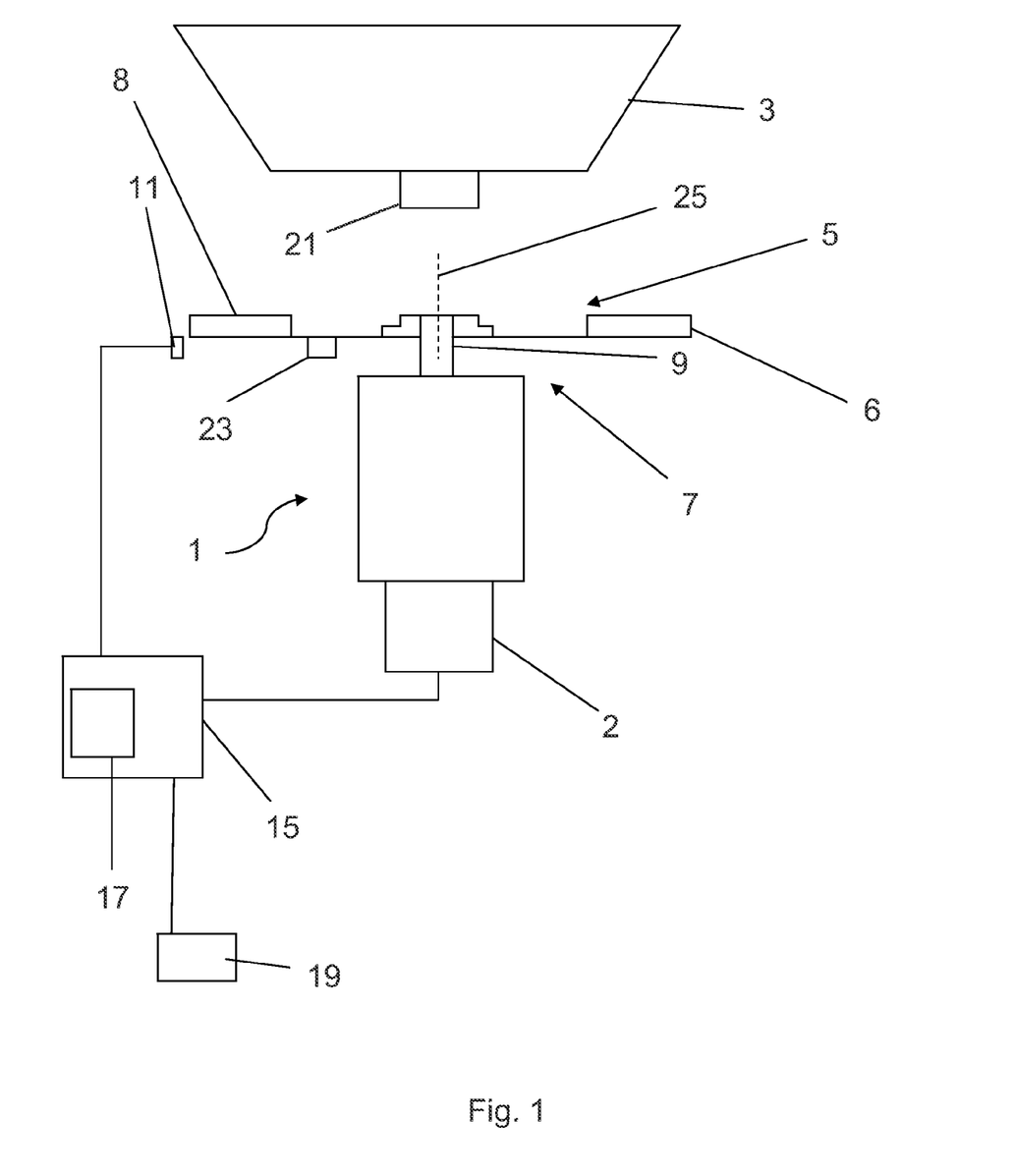
FIG. 1 is a schematic view of a first embodiment of a disc spreader of the present invention.

FIG. 1 is a view of a disc spreader 1. The disc spreader 1 includes at least one controllable metering device 3 and at least one distributor disc 5, which includes thrower blades 6, 8. The at least one controllable metering device 3 feeds granular material to the at least one distributor disc 5. A device 21 may be provided for adjusting the point at which the granular material is placed on the distributor disc 5. A motor 2 is provided for driving the disc spreader 1. The motor 2 may change the rotational speed of the distributor disc 5. A drive train 7 of the distribution disc 5 includes at least one shaft 9. A sensor 11 is arranged near the circumference of the distributor disc 5. The sensor 11 may be a contact-free sensor, a radar sensor or an ultrasonic sensor. The sensor 11 may be pivoted concentrically with respect to a rotational axis 25 of the distributor disc 5. The sensor 11 may be pivoted by an angle of at least 100°. The sensor may be adjusted as a function of the distributor disc 5 and/or the thrower blades 6, 8. Data from the sensor 11 is provided as input to a control unit 15. The control unit 15 comprises a database 17. The database 17 comprises functional dependencies of at least one setting parameter of a device for changing the spreading ring sector. A set point value 19 is provided as input in the control unit 15. A device 23 may be provided for adjusting the thrower blades of the distributor device.

Figure 2:
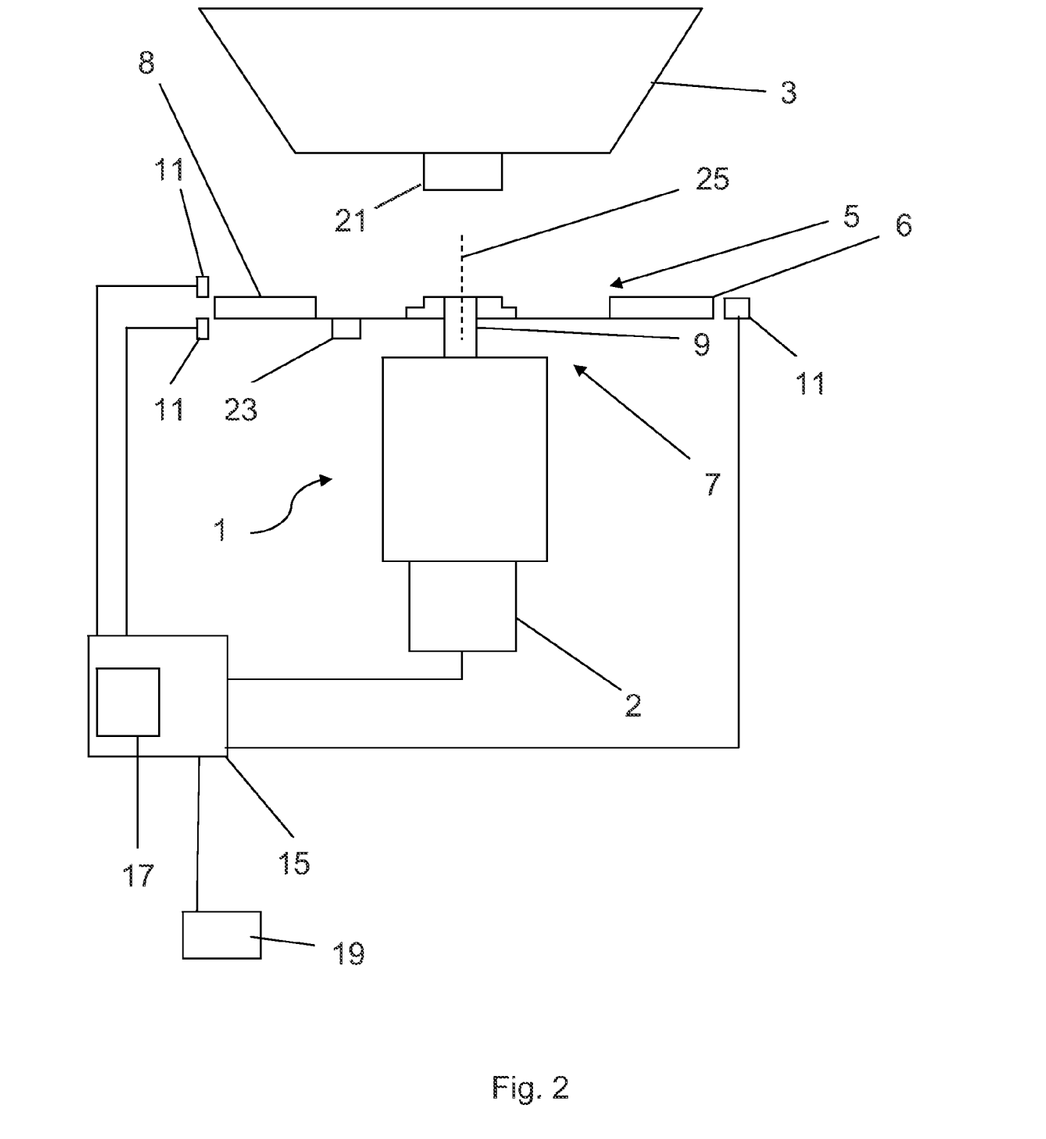
FIG. 2 is a schematic view of a second embodiment of a disc spreader of the present invention.

FIG. 2 shows another embodiment of the disc spreader 1, which is the same as the embodiment of the disc spreader shown in FIG. 1, but further includes a multiplicity of sensors 11 arranged concentrically around the circumference of the rotational axis 25 of the distributor disc 5. The sensors 11 are connected to the control unit 15. The sensors 11 may be arranged through an angle of at least 100° around the circumference of the rotational axis 25 of the distributor disc 5.

Figure 3:
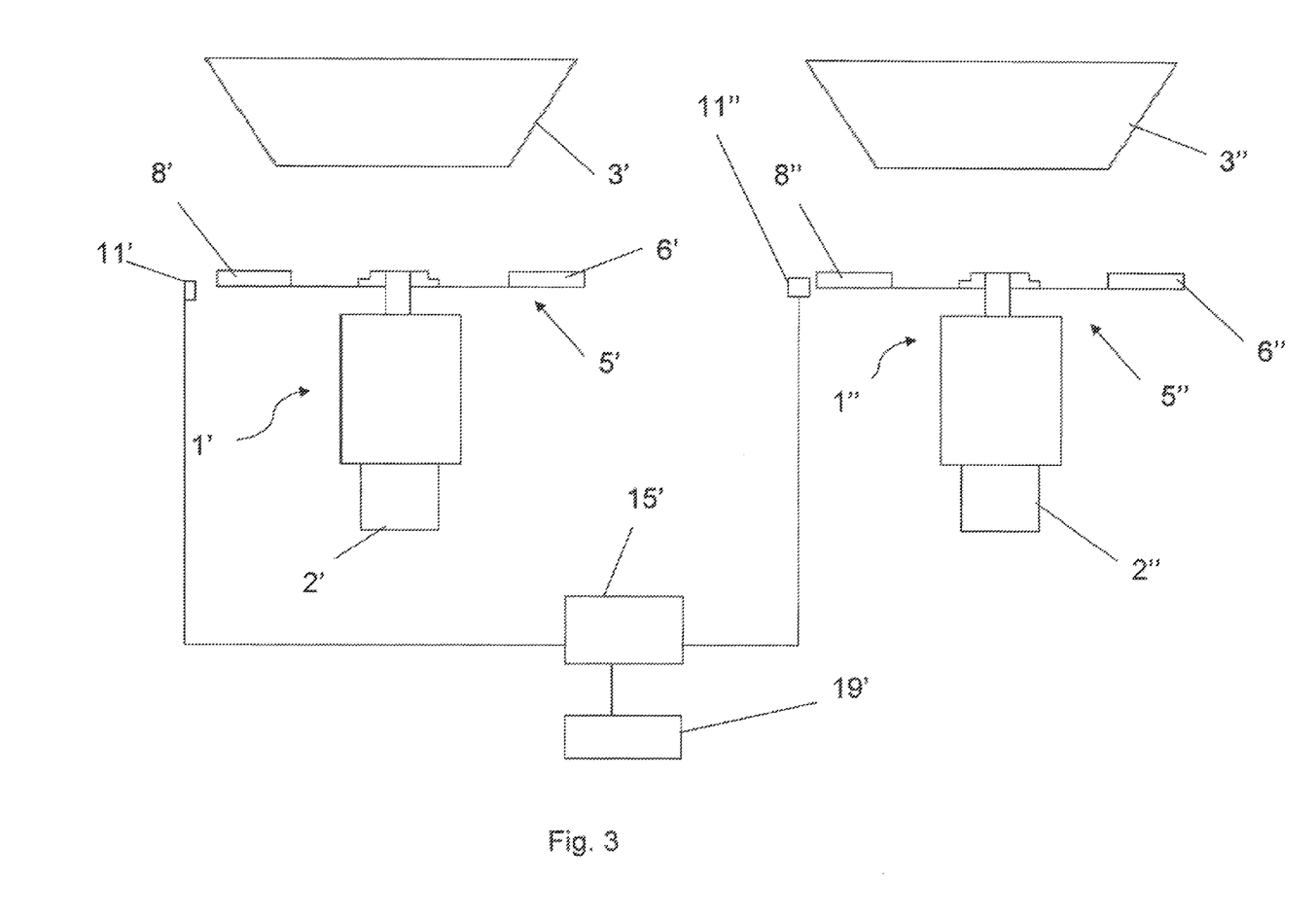
FIG. 3 is a schematic view of two disc spreaders of the present invention.

FIG. 3 shows two disc spreaders 1', 1" and two controllable metering devices 3', 3". One of the disc spreaders 5' is arranged underneath one of the controllable metering devices 3' and another one of the disc spreaders 5" is arranged underneath another one of the controllable metering devices 3". One of the disc spreaders 1' has a distributor disc 5' that has thrower blades 6', 8' and another one of the disc spreaders 1" has a distributor disc 5' that has thrower blades 6", 8". At least one sensor 11' is arranged near the circumference of the distributor disc 5' and at least one sensor 11" is arranged near the circumference of the distributor disc 5". The sensors 11', 11" are connected to a control unit 15' with each of the sensors 11', 11" providing an actual value of a throwing parameter as input to the control unit 15'. A set point value 19' is provided as input to the control unit 15'.

Figure 4:
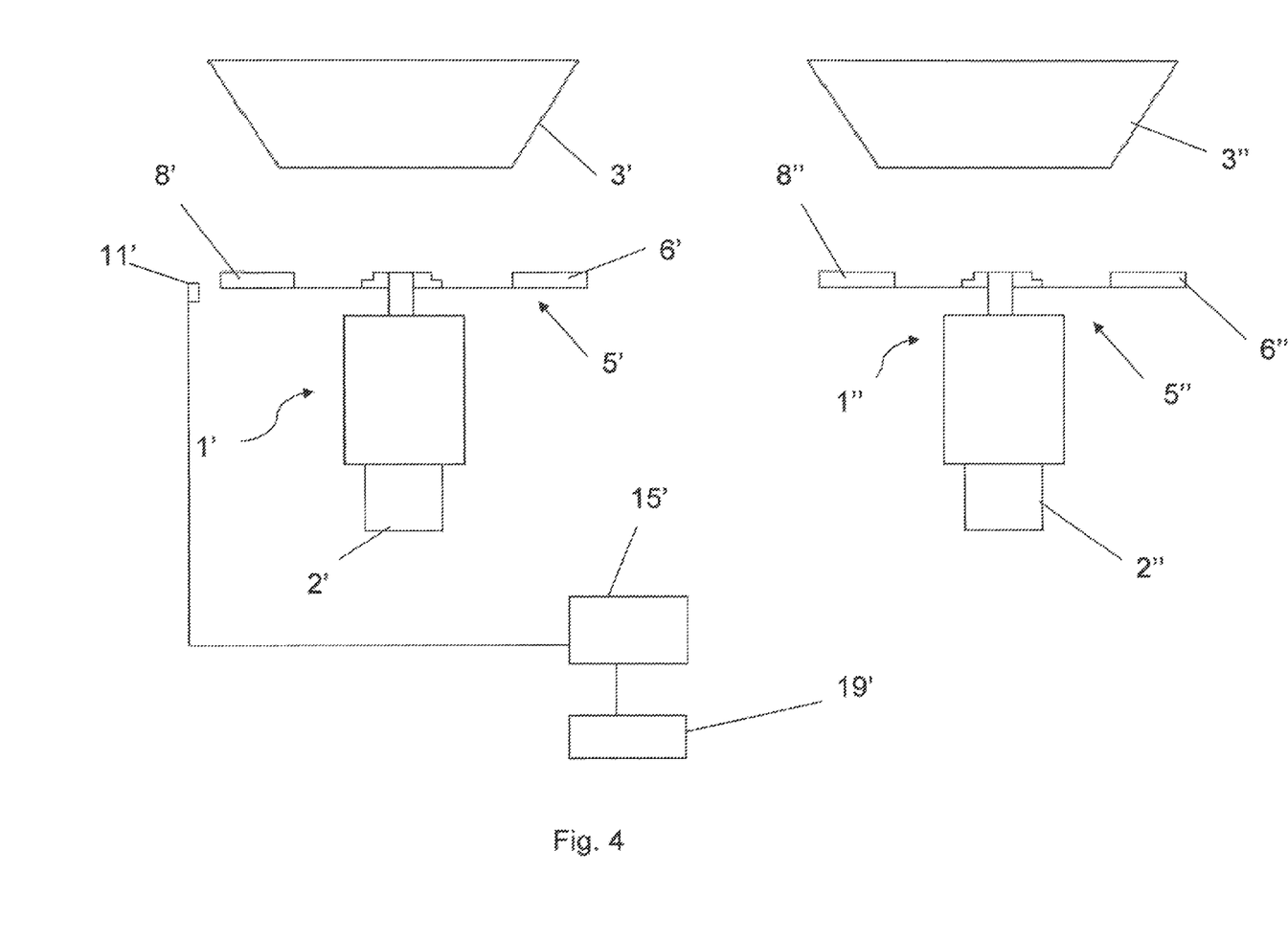
FIG. 4 is a schematic view of another embodiment of two disc spreaders of the present invention.

FIG. 4 shows another embodiment of the two disc spreaders 1', 1", which is the same as the embodiment of the disc spreaders 1', 1" shown in FIG. 3 except that only one sensor 11' is provided near the circumference of one distributor disc 5' such that only one sensor 11' provides an actual value of a throwing parameter as input to the control unit 15'.

While specific embodiments of the invention have been shown and described in detail to illustrate the application of the principles of the invention, it will be understood that the invention may be embodied otherwise without departing from such principles.

What is claimed is:

1. A method for controlling at least one device for changing the spreading ring sector of a disc spreader which comprises at least one controllable metering device, at least one distributor disc which is arranged underneath the metering device and is provided with thrower blades, and the at least one device for changing the spreading ring sector of the granular material on the ground, the method comprising:
storing functional dependencies of at least one setting parameter of the device for changing the spreading ring sector on at least one throwing parameter in a database of a control unit which is assigned to the device for adjusting the spreading ring sector;
providing a set point value of the throwing parameter and/or of the setting parameter corresponding thereto as input in the control unit;
determining at least one actual value of the throwing parameter using at least one sensor which is arranged near a circumference of the distributor disc;
comparing the actual value, which is determined using the sensor, of the throwing parameter with the set point value thereof in the control unit; and
readjusting the setting parameter of the device for changing the spreading ring sector if the actual value of the throwing parameter deviates from the set point value by more than a predetermined maximum value such that the throwing parameter which corresponds thereto deviates from the set point value thereof by less than the maximum value, wherein the functional dependencies, stored in the database, of the at least one setting parameter on the at least one throwing parameter take into account a type of the respective distributor disc and/or the thrower blades thereof, wherein one of the type of the respective distributor disc and/or the thrower blades thereof is provided as input in an input device of the control unit, the type of the respective distributor disc and/or the thrower blades thereof is detected by the sensor and the type of the respective distributor disc and/or the thrower blades thereof is detected by means of an RFID transponder of the respective distributor disc and/or the thrower blades thereof.

2. A method according to claim 1, wherein the functional dependencies, stored in the database, of the at least one setting parameter of the device for changing the spreading ring sector on the at least one throwing parameter also take into account one or more of physical properties of the respective granular material, in particular the flight properties thereof, a respective mass flow of granular material which is placed on the distributor disc by means of the metering device and a respective working width.

3. A method according to claim 1, wherein set point values of the throwing parameter or of the setting parameter, corresponding thereto, for one more of various types of distributor discs and the thrower blades of the distributor discs are determined experimentally and provided as input in the control unit.

4. A method according to claim 3, wherein the set point values of the throwing parameter or of the setting parameter corresponding thereto are also determined experimentally for one or more of physical properties of various granular materials, various mass flows of granular material which is placed on the distributor disc by means of the metering device and various working widths and are provided as input in the control unit.

5. A method according to claim 1, wherein the throwing parameter is a parameter which is representative of a circumferential distribution of the granular material.

6. A method according to claim 5, wherein the parameter which is representative of the circumferential distribution of the granular material comprises at least one angle value in a polar coordinate system with a center which is arranged on a rotational axis of the distributor disc and which is capable of representing the circumferential distribution of the granular material.

7. A method according to claim 1, wherein the throwing parameter is determined from at least one measured value, acquired by the sensor, said at least one measured value comprising one or more of a mass flow of the granular material which is thrown by the distributor disc in a respective circumferential area, a speed of the granular material which is thrown by the distributor disc in a respective circumferential area and a direction of the granular material which is thrown by the distributor disc in a respective circumferential area.

8. A method according to claim 1, wherein at least one of separate functional dependencies of the at least one setting parameter on the at least one throwing parameter and separate factors for adapting the functional dependencies of the at least one spreading parameter on the at least one throwing parameter to the respective distributor disc and/or the thrower blades thereof are stored in the database of the control unit for each type of a respective distributor disc and/or the thrower blades thereof.

9. A method according to claim 8, wherein the functional dependencies of the at least one setting parameter on the at least one throwing parameter are characteristic lines, characteristic curves or characteristic diagrams.

10. A method according to claim 1, wherein the actual value of the at least one throwing parameter is determined using at least one contact-free sensor.

11. A method according to claim 10, wherein the actual value of the at least one throwing parameter is acquired using at least one radar sensor or ultrasonic sensor.

12. A method according to claim 10, wherein the contact-free sensor emits a measuring signal with a directional component which is directed vertically upwards.

13. A method according to claim 1, wherein said at least one sensor is pivoted concentrically with respect to a rotational axis of the distributor disc, wherein the sensor supplies the throwing parameter or measured values which are representative thereof at different angular positions.

14. A method according to claim 13, wherein the at least one sensor is pivoted by an angle of at least 100°.

15. A method according to claim 1, wherein a multiplicity of sensors is arranged concentrically around a circumference of a rotational axis of the distributor disc, wherein each sensor supplies the throwing parameter or measured values representative thereof for a respective circumferential position associated with one of said sensors.

16. A method according to claim 15, wherein the multiplicity of sensors is arranged through an angle of at least 100° around the circumference of the rotational axis of the distributor disc.

17. A method according to claim 1, wherein:
the sensor is adjusted as a function of the respective distributor disc and/or the thrower blades thereof in a predefined position for the respective distributor disc and/or the thrower blades thereof essentially radially with respect to the rotational axis of the distributor disc; and/or a multiplicity of sensors arranged in different radial positions with respect to the distributor disc, said sensors being activated or deactivated as a function of the respective distributor disc and/or the thrower blades thereof.

18. A method according to claim 1, wherein the step of determining the at least one actual value of the throwing parameter, the step of comparing the actual value of the throwing parameter with the set point value thereof in the control unit and the step of readjusting the setting parameter of the device for changing the spreading ring sector if the actual value of the throwing parameter deviates from the set point value by more than a predetermined maximum value are carried out essentially continuously or at periodic time intervals during the spreading work.

19. A method according to claim 1, wherein the disc spreader comprises at least two controllable metering devices, in each case a distributor disc which is arranged underneath a respective metering device and is provided with thrower blades, and in each case a device, assigned to a respective distributor disc, for changing the spreading ring sector of the granular material on the ground, wherein:
   the at least one actual value of the throwing parameter is determined using in each case at least one sensor, arranged near to a circumference of each distributor disc, for each distributor disc independently of one another;
   the actual value of the throwing parameter which is determined using the respective sensor is compared with the set point value thereof in the control unit; and
   in the case of a deviation of the actual value of the throwing parameter from the set point value by more than a predetermined maximum value the setting parameter of a respective device for changing the spreading ring sector is re-adjusted independently of one another, with the result that the respective throwing parameter which corresponds thereto for each distributor disc deviates from the set point value thereof by less than the maximum value.

20. A method according to claim 19, wherein a set point value, which is the same for all the devices for changing the spreading ring sector, or a plurality of set point values, different for the respective devices for changing the spreading ring sector, of the throwing parameter and/or of the setting parameter corresponding thereto is/are provided as input in the control unit.

21. A method according to claim 1, wherein the disc spreader comprises at least two controllable metering devices, in each case a distributor disc which is arranged underneath a respective metering device and is provided with thrower blades, and in each case a device, assigned to a respective distributor disc, for changing the spreading ring sector of the granular material on the ground, wherein:
   the at least one actual value of the throwing parameter is determined using at least one sensor, arranged near to a circumference of only one distributor disc, for said only one distributor disc;
   the actual value of the throwing parameter which is determined using the sensor which is assigned to this distributor disc is compared with the set point value thereof in the control unit; and
   in the case of a deviation of the actual value of the throwing parameter from the set point value by more than a predetermined maximum value the setting parameter of all the devices for changing the spreading ring sector is re-adjusted in a way which corresponds to one another, with the result that the throwing parameter, corresponding thereto, of the distributor disc provided with the sensor deviates from the set point value thereof by less than the maximum value.

22. A method according to claim 1, wherein the device for changing the spreading ring sector comprises one of a device for adjusting the point at which the granular material is placed on the distributor disc, the setting parameter of which is the point at which the granular material is placed on the distributor disc, a device for changing the rotational speed of the distributor disc, the setting parameter of which is the rotational speed of the distributor disc, and a device for adjusting the thrower blades of the distributor disc, the setting parameter of which is a relative position of the thrower blades with respect to the distributor disc.

* * * * *